United States Patent Office 2,777,238
Patented Jan. 15, 1957

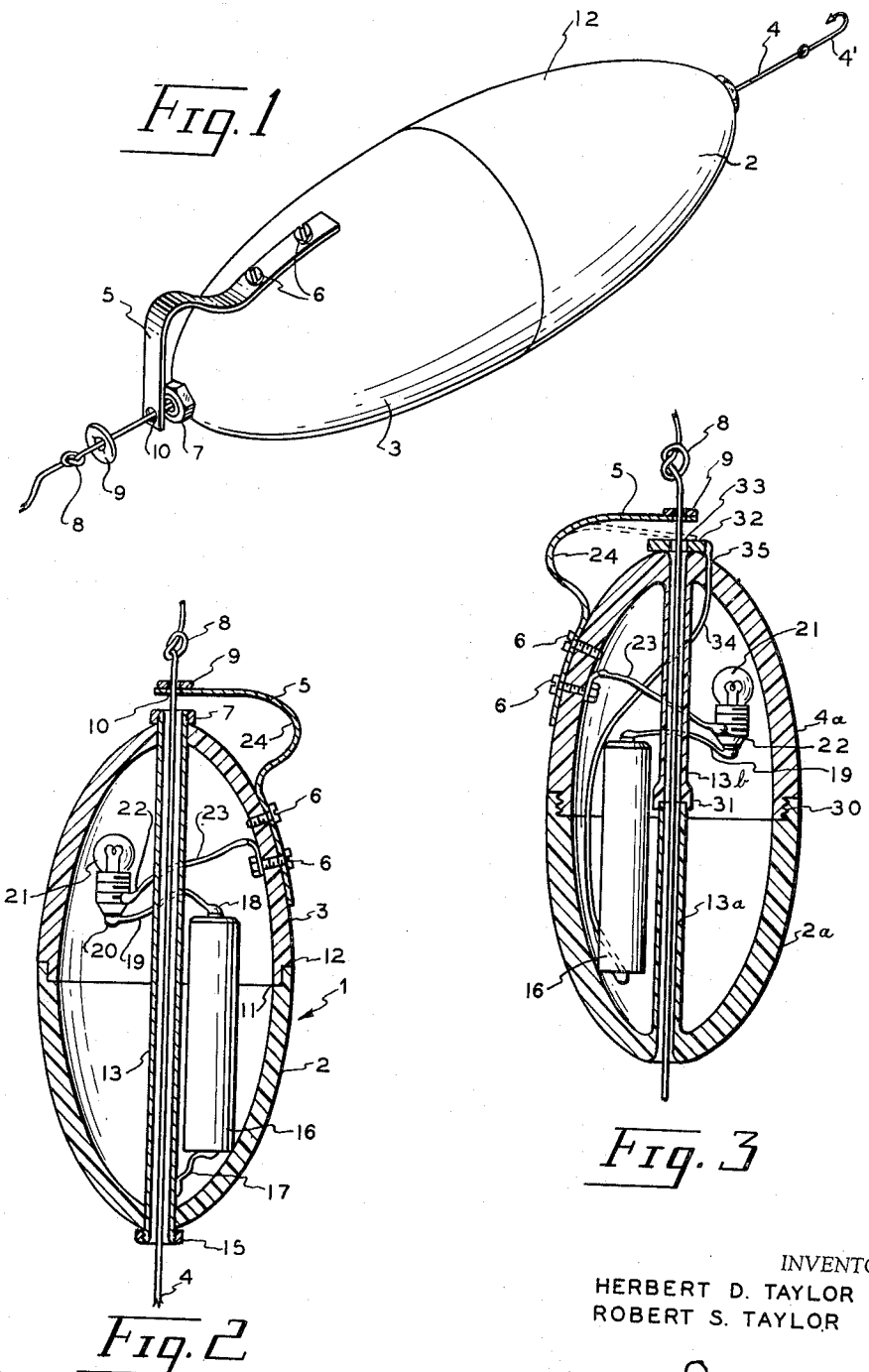

2,777,238

CASTING FLOATS FOR FISHING LINES

Herbert D. Taylor and Robert S. Taylor, Arlington, Va.

Application November 24, 1952, Serial No. 322,231

4 Claims. (Cl. 43—17)

The present invention relates generally to casting floats for fishing lines, and more particularly to novel casting floats which are normally unilluminated and which have provision for illumination in response only to a tug on the lines produced by fish attached to the lines.

It is an object of the invention to provide a novel illuminatable casting float for fishing lines.

It is a further object of the invention to provide a novel casting float for fishing lines of the type which illuminates in response to nibbles on the lines, and which ride freely on the lines, so that casting is not interfered with.

Another object of the invention resides in the provision of a novel illuminatable casting float for fishing lines, which is fabricated of a minimum number of simple parts, and is therefore economical to build.

It is still another object of the invention to provide a casting float which is readily assembled and disassembled, as may be required for replacement of batteries, lamp bulbs, and the like.

Another object of the invention resides in the provision of a casting float for fishing lines which is readily adjusted to various weights of sinker, and depth of hang of line under the surface of the water, without disassembling the device.

The above and still further objects, features and advantages of the present invention will become apparent upon consideration of the following detailed description of two embodiments thereof, especially when taken in conjunction with the accompanying drawings, wherein:

Figure 1 is a view in perspective of a casting float arranged in accordance with the present invention; and, Figures 2 and 3 are views in transverse section taken along a longitudinal axis, of two embodiments of a casting float in accordance with the present invention, showing the electrical connections and internal construction thereof.

Referring now more specifically to Figures 1 and 2 of the accompanying drawings, the reference numeral 1 represents the body of a casting float of light transmitting material, preferably fabricated of plastic, although other materials may be employed if desired, and formed generally of two halves, of which the lower half 2 is normally disposed under the upper half 3, when the float is in the water. Passing through the float along its longitudinal axis is a fishing line 4 having a hook 4′ attached to its lower end. Adjacent the upper end of the line 4 is a spring contact switch member 5, secured to the float 1 by means of suitable bolts 6, and a further nut contact member 7, which cooperates with the resilient contact switch member 5 to close a circuit internally of the device. The line 4 may be knotted, as at 8, the location of the knot determining how far within the water the line 4 will extend, and an annular plastic bead 9 may surround the line intermediate the knot 8 and an aperture 10 in the resilient switch member 5. The bead 9 has the purpose of preventing cutting of the line 4 on any sharp edges present in the aperture 10, and also of rendering the size of the aperture 10 of no significance to the design of the device, since the annular element 9 itself is provided with an aperture just sufficient for passage of the line 4.

In the embodiment of the present invention illustrated in Figure 2 of the accompanying drawings, the lower portion 2 of the casting float 1 is provided with an external shoulder 12 at its upper edge, and the upper portion 4 of the casting float 1 is provided with an internal annular shoulder 11 at its lower edge, the two shoulders being dimensioned to join snugly, so that upon compression of the halves 2 and 4 a water-tight joint is presented at the junction of the shoulders 11 and 12.

A metallic cylindrical passageway is provided axially of the float 1, by means of a thin hollow elongated metallic cylinder 13, having threaded ends. The metallic tube 13 extends entirely through the float 1, and for a short distance on either side thereof. At the extensions of the tube 13, where it extends beyond the confines of the float 1, the threaded portions of the tube 13 are threadedly engaged by nuts 7 and 15, respectively. When these are tightened they provide a water-tight seal at the points of entrance of the tube 13 into the interior of the float 1, and also serve to compress the shoulders 11, 12, to provide a water-tight seal at the line of junction of the two halves, 2 and 4, of the float.

While the described construction has been found to provide water-proof construction over a long period of time, the user may, if he desires, further seal the possible leakage points of the device by means of cement, or the like.

Internally of the float is provided a small dry cell 16, one terminal of which is connected to the metal tube 13 as by means of a soldered connection 17. The other terminal 18 of the cell 16 is connected by means of a wire 19 to one terminal 20 of a lamp 21. A remaining terminal 22 of the lamp 21 is connected via a further wire 23 to one of the bolts 6. Thereby upon contact of the resilient switch element 5 with the nut 7 or, what comes to the same thing, the tube 13, a circuit is completed from the dry cell 16 to the lamp 21, and the latter becomes illuminated.

The contact element 5 is provided with a goose-neck, as 24, to provide for adjustment of tension and spacing, and by manual manipulation of the switch element 5, as by bending that end of the element 5 which is adjacent the nut 14 into closer proximity thereto, or farther therefrom, the device will be found to support lesser or greater weights of lead on the line 4, without completion of the circuit in response solely to the weight of the hooks and sinkers normally attached to the line 4. At the same time the adjustment may be so made that in response to the slightest tug caused by a fish seizing the line, or attempting to secure bait thereon, the knot 8 on the line 4 will press against the spring element 5, and close the circuit. Thereby, illumination of either a permanent, or a transient and recurrent, pattern, will be generated, and the experienced fisherman may determine therefrom whether a fish has attached itself to the line, or is toying with the bait. The present invention makes practical night casting, and renders same far more pleasurable, since the casting float is normally so far from the fisherman that the movements of the usual float are always invisible in the dark while the present float is invisible only when fish are not nibbling. The invention contributes greatly to the success of fishing expeditions, making it far less likely that a given fish will escape, and reducing eye strain, and thereby tension of the fisherman.

The lower end of the float may rest against the sinkers (not shown) attached to the line 4, during actual casting, since the float 1 can move freely on the line 4, except insofar as its movement is stopped by the knot 8.

This contributes to accuracy of casting, for which reason the present float is found to be far superior to types of casting floats in which the float is attached to a fixed point along the line. At the same time the knot 8 may be placed at any place along the line as suits the judgment of the fisherman. While floats having axial passages therein are per se old, the construction of the present device in respect to its illuminating features does not necessitate modification of the design of the float, but retains the provision of complete freedom of movement of the float along the line 4, so that the float will not interfere with casting.

Reference is now made to Figure 3 of the accompanying drawings, wherein is illustrated, in cross section taken on the longitudinal axis of the float, a modification of the structure of Figure 2. In the structure of Figure 3 the area of junction of the two halves 2a and 4a of the float, are provided with screw threads 30, to enable threaded engagement of the halves of the float. This has the advantage over the structure of Figure 2, that it is not necessary to remove nuts in order to separate the float for replacement of lamps or dry-cell.

The axial passageway, which in the structure of Figure 2 is a metallic tube, is in the structure of Figure 3 cast of the same material of which the float is made, and formed as continuations thereof. In order to provide a water-tight passageway the halves 2a, 4a, of the float proper are provided each with its own half tube 13a, 13b, respectively. The tube halves 13a, 13b are provided at their joining ends with a nesting structure. To this end the tube section 13b is provided with an enlarged end 31, having therein a slight depression adapted to receive the nesting end of the tube section 13a. The lengths of the tube sections 13a, 13b are so chosen that when the halves 2a and 4a of the float are firmly threadedly engaged, the ends of the tube sections 13a, 13b are pressed together with great firmness, and thereby present a water-tight construction at their point of juncture.

Since in the construction of Figure 3 no metallic tube is available for connection to the battery to the dry cell 16 a metallic washer as 32 is cemented to the apex of the float 1, having an aperture 33, co-axial with opening in the tube 13b. Connection is made by a wire 34, and through a fine opening 35 in the upper half 4a of the float, to the washer 32. The remaining terminal of the battery, as in the case of Figure 2, is connected via a line 19 to one terminal of lamp 21 and the remaining terminal 22 of the lamp 21 is connected by a lead 23 to one of bolts 6.

While we have described and illustrated two specific and preferred embodiments of the invention, in accordance with the requirements of the patent statutes, it will be realized by those skilled in the pertinent art that variations of the construction may be resorted to, especially in respect to details of construction, without departing from the teachings of the invention, as defined in the appended claims.

What we claim is:

1. A casting float for a fishing line having a hook end and a stop spaced from said hook end, comprising, a hollow shell constructde of two joined parts, an open tube providing a passageway extending axially through said shell, and having an internal diameter adequate to pass said fishing line freely, a source of electric power within said shell, an electric lamp within said shell responsive to power from said source for providing illumination, at least a portion of said hollow shell in the path of illumination from said lamp being light transparent, a switch secured externally of said shell and to said shell, said switch having a stationary element and a movable element having an aperture, said movable element being constructed of resilient metal, means interconnecting said switch power source and lamp to supply said power to said lamp on closure of said switch, means securing said movable element so that its aperture is adjacent to and co-axial with said open tube, said aperture being sufficiently large to enable free passage of said fishing line therethrough, but not to enable said stop to pass therethrough, said stop being positioned to actuate said movable element on predetermined travel of said hook away from said float in a predetermined direction.

2. The combination in accordance with claim 1 wherein said tube is metallic, having threaded ends, and wherein are provided nuts threadedly engaging said threaded ends for compressing said two joined parts.

3. The combination in accordance with claim 1 wherein said tube is fabricated of two collinear elements, each integral with one of said two joined parts, and wherein threads are provided at the area of junction of said parts for threadedly engaging the one with the other.

4. A casting float for a fishing line having a hook attached thereto, and a stop spaced from said hook, comprising, a hollow shell, said shell containing a source of electric power and a lamp bulb illuminatable by power from said source of power at least a portion of said hollow shell in the path of illumination from said bulb being light transparent, a hollow rectilinear tube extending through said shell on an axis of symmetry thereof, said tube having open ends, a stationary contact at one of said open ends, a movable resilient contact having an aperture adjacent one end thereof, said aperture being co-axial with said one end of said tube, and, said movable resilient contact being secured to said shell at its other end, said aperture and tube being dimensioned so that said fishing line may pass freely through both, and electrical connections connecting in series said source of power, said lamp and said two contacts, said stop being of greater diameter than said aperture to engage and actuate said movable resilient contact.

References Cited in the file of this patent

UNITED STATES PATENTS

| | | |
|---|---|---|
| 127,218 | Brown et al. | May 28, 1872 |
| 241,150 | Norwood | May 10, 1881 |
| 402,231 | Coles et al. | Apr. 30, 1889 |
| 989,145 | Hatchett | Apr. 11, 1911 |
| 2,110,596 | Gaede | Mar. 8, 1938 |
| 2,223,823 | Hampton | Dec. 3, 1940 |
| 2,226,331 | Allison | Dec. 24, 1940 |
| 2,425,825 | Philips | Aug. 19, 1947 |
| 2,464,309 | Harshman | Mar. 15, 1949 |